3,107,739
WELL FLUIDS AND ADDITIVE THEREFOR
Roderic G. Mathews, Houston, Tex., assignor to Magnet Cove Barium Corporation, Houston, Tex.
No Drawing. Filed Oct. 31, 1960, Ser. No. 65,905
4 Claims. (Cl. 175—72)

This invention relates to the field of fluids useful in well operations, such as drilling, completion and work over of wells. It is particularly directed to improved well fluids having high tolerance for hydratable clays and clay-like materials. In one aspect it relates to drilling fluids particularly useful in drilling through strata of mud-making materials such as clays and heaving shales, and in other aspects it relates to improved additives for drilling fluids, improvements in processes for preparing drilling fluids, and to improvements in well operations conducted in the presence of such fluids.

In many locations, particularly along the Gulf Coast of the United States, oil and gas wells often encounter beds of heaving shale or clay-like materials which have a tendency to become hydrated by contact with an aqueous drilling mud. The heaving shales are particularly troublesome because water contained in the drilling fluid hydrates them and causes them to swell and crack so that walls of a bore hole have a tendency to slough off. Shale falling into the bore hole is ground up into very fine particles by the drilling bit and these fine particles are further hydrated to increase the hydrated clay materials normally present in the well fluid. As a result, the well fluid or mud becomes so thick that it is unusable without excessive treatment with thinners such as quebracho, hemlock extract or other tannins, lignosulfonates, etc. When the mud thickens excessively, it often must be thinned with additional water and materials must be added to maintain the required specific gravity and water-loss characteristics of the mud. Such additions frequently are quite expensive but are not the only disadvantages encountered in drilling through such strata.

In passing through strata of heaving shales, the sides of the bore hole frequently slough off to form cavities of considerable size, and the quantity of material dropping into the bore hole may be so great as to result in a stuck bit or drill stem. Cavities in the strata also make cementing the well expensive, and centering of the casing in the bore hole is difficult when cavitation occurs.

A great many special drilling fluids or muds have been developed for drilling through mud-making formations. The calcium inhibited muds have been widely used for this purpose, and are characterized by the fact that they contain sufficient calcium ions in an aqueous phase to convert at least a part of the more hydratable sodium type of clay-like materials to a corresponding less hydratable calcium type. The calcium surfactant muds are among well fluids of this type and are characterized by containing a primary surfactant, which is a water soluble organic surface active material effective to agglomerate clay particles into aggregates which are larger in size than true colloids. These surfactants form a monomolecular layer on the surface of the clay platelets and cause the clay platelets to agglomerate in face-to-face parallel arrangement. Since an excess of surfactant is maintained in such mud, clays or clay-like materials entering the system form the formation become coated with surfactant and are formed into aggregates in this manner, thus reducing the tendency of the mud to thicken excessively. When passing through massive beds of heaving shale, considerable quantities of expensive surfactant must be added to these muds at intervals to maintain an excess of surfactant in the mud.

Emulsions of oil-in-water and invert emulsions of the water-in-oil type also have been used to minimize hydration of the mud-making material by decreasing the amount of water in the well fluid and, especially in the invert emulsions, by decreasing direct contact of the hydratable clay materials with water.

While all the types of mud given above have advantages in decreasing the hydration of clay-like materials, they also have disadvantages of greater or lesser extent. For example, some of these muds are quite expensive to prepare; others are quite sensitive to salts, and beds of salt are often encountered at locations not too far removed from heaving shales. Others are difficult to use in that they require close supervision and constant additions of materials to the mud.

It will be seen that the provision of a material which is more effective in preventing the normal hydration of hydratable clay-like materials in muds of a wide variety of types would permit drilling through strata of mud-making materials with less treatment of the mud and would enhance the resistance of all the types of mud given above to contamination by clays, heaving shale, and clay-like materials.

It is an object of this invention to provide an additive for well fluids which prevents normal hydration of bentonites, shales and other hydratable clay materials.

Another object is to provide a new cationic surfactant-salt complex of unique structure, useful as a mud additive, effective to produce a mud having superior tolerance to low gravity drilled solids and high resistance to contamination by salt, anhydrite and green cement.

Another object is to provide an additive of this type which is compatible with calcium surfactant muds, and drastically reduces the quantity of surfactant consumed by such muds in passing through strata of mud-making materials.

Another object is to provide an additive of this type which is easily soluble in water and may be stored in concentrated aqueous solution under ordinary storage conditions and which is very easy to mix with drilling fluids.

Another object is to provide an improved drilling fluid which has exceptionally high tolerance towards clays, shales and similar hydratable materials.

Another object is to provide a well fluid having rheological properties which are improved by long continued heating.

Another object is to provide an improved well fluid in which desirable rheological properties are easily maintained with a minimum of treatment.

Another object is to provide an improved treatment for well fluids, when beds of hydratable clay-like materials are encountered, in which high tolerance to low gravity solids is important to the well fluid.

Another object is to provide an improved well fluid additive which is easily prepared with use of a minimum of time and equipment and which is compatible with water-base muds, oil-in-water emulsions or invert emulsions.

Another object is to provide an additive of this type which forms a monomolecular coating on the surface of clay particles thereby excluding water from contact with the particles and preventing normal hydration of clays and clay-like materials.

The well fluid additive of this invention consists essentially of a surfactant product made by reacting a material selected from the group consisting of water soluble salts of copper and zinc with a material selected from the group consisting of tetrahydroxyethylethylenediamine,
dihydroxyethyldihydroxypropylethylenediamine,
dihydroxyethylethylenediamine, dihydroxypropylethylenediamine,
dihydroxypropylpropylenediamine,
dihydroxyethylpropylenediamine,
dihydroxyethyldihydroxybutylethylenediamine,
ethylenediamine,
triethylenetetramine,
tetraethylenepentamine.

The chlorides of copper and zinc are the preferred salts for use in preparation of this material. The products of the reaction are chelates of which the following structural formula for the tetrahydroxyethylethylenediamine chelate is typical.

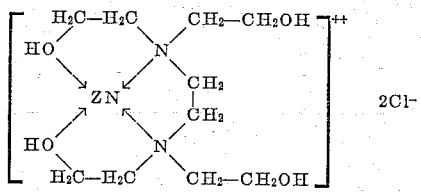

They are cationic alkanol amine-metal chelates highly soluble in water so that aqueous solutions having specific gravity above 1.4 are easily prepared. These chelates have substantially no effect on the surface tension of water but are particularly effective in forming a monomolecular layer upon the surface of clay particles, and these layers are highly effective in preventing hydration of the clay.

The zinc ion apparently is chelated by the alkanol amine molecule through dative bonding from the oxygen and nitrogen atoms to the "M" electron level, leaving the "N" or valence shell free to give the 2+ charge. Thus, the positive chelate is strongly attracted to the negative clay surfaces and presumably coats them to the exclusion of water.

The chelated materials are easily prepared. The preparation involves merely the solution of a zinc or copper salt, preferably the chloride, in water, addition of an amine selected from the group given above to the solution and stirring until the solution becomes homogeneous. The metal salt and amine are used in equimolecular proportions.

The chelates formed from copper and zinc salts are almost identical in their effect; and since the zinc salts are cheaper, they are the preferred materials for this reaction. Zinc chloride is preferred to zinc sulfate because the product can be made up to an aqueous solution containing about 80 percent of the cheleate whereas the prodcut from zinc sulfate is not so soluble. The preferred alkanol amine used in the reaction is tetrahydroxyethylethylenediamine.

One preferred method of preparing the chelate solution is to use 72° Baumé (70.5 percent) zinc chloride solution readily available on the market. The required quantity of the amine used can be stirred into the zinc chloride solution. It reacts immediately to form a product which is an aqueous solution of the chelate. The reaction is exothermic and cooling facilities should be provided.

The drilling muds of the present invention are the ordinary drilling muds in common use modified by the presence of the chelate surfactants of the present invention. The muds may be of the ordinary field clay type or of calcium treated type. Either the ordinary clay type mud or a calcium treated mud may be used in drilling down to a massive formation of heaving shale or mud-making material and then easily converted into a mud of the present type by adding the prepared chelate surfactant or alternatively adding the amine and zinc or copper salt to the mud. Substantially identical results are obtained when the prereacted chelate is added to the mud or when the chelate is formed in situ.

In breaking over an ordinary clay mud or a calcium inhibited mud to a mud of the present type, it is usually advisable to dilute the field mud with water prior to adding the chelate or the amine and metal salt to form the chelate in situ. The exact amount of dilution cannot be determined without a short and simple test on the mud at the particular well site as it is somewhat variable and depends on both quantity and type of clay present. The reason for dilution is that the mud thickens strongly upon addition of the chelate, but on continued agitation it thins out again. The mud should be diluted sufficiently that the first thickening caused by addition of the chelate does not make the mud unpumpable or difficult to mix. In addition to the chelates or the materials for their formation, some attapulgite preferably should be added to the mud to increase its weight supporting power since, even if prehydrated, the bentonites are aggregated by the surfactant chelates of the present invention and some of their water-loss controlling and weight supporting powers are lost. Since attapulgite does not depend upon hydration and swelling for these effects, it is a preferred material for this use.

Due to the nonhydrating nature of this system, the fluid-loss reducing properties normally associated with clays, such as bentonite, are absent. Several of the commonly used fluid-loss control agents are not compatible with the chelate surfactants of the present invention. For example, a widely used lignosulfonate material sold under the trade name of "Q-Broxin" is not effective for reducing fluid loss even when added in quantities as high as 10 pounds per barrel. A hydrolyzed polyacrylonitrile sold under the trade name "Cypan" causes severe settling when added in quantities sufficient to control fluid loss. The partially hydrolyzed starches also are relatively ineffective for this use. The preferred material for fluid-loss control is CMC which has the added advantage of thinning a mud containing the present chelate surfactants. A marked decrease in mud viscosity is observed to result from additions of CMC in quantities up to approximately 3 pounds per barrel. The exact mechanism of this thinning action is not known but it does not effect the fluid-loss reducing qualities of CMC.

Oil and the emulsifiers commonly used in calcium surfactant muds are entirely compatible with the chelate surfactants of the present invention and are excellent for supplementing the fluid-loss control properties of CMC.

Since CMC starts to decompose at temperatures about 250° F., the muds of the present invention are especially recommended for temperatures not far exceeding this value. The upper limit of utility will be set by the amount of CMC necessary to be added to the mud to replace that decomposed by heat. These muds, however, show improved rheological properties on long continued heating at temperatures of about 250° F. or less. In the temperature range for which they are designed, the fluid-loss and rheological properties may be held at desirable levels with a minimum of treatment; and since hydratable solids remain practically inert in the presence of the present additives, muds of this type promote stabilization of well bore and they improve production.

An excess of chelate should be maintained in the present muds, preferably about two pounds per barrel. The quantity of excess chelate present is easily determined at the well head by a simple "Cuprisene" test which is based upon the photometric measurement of an ion exchange reaction between two metal chelates. "Cuprisene" consists of one percent $CuCl_2 \cdot 2H_2O$ in standard Versenate solution, the cupric ion being chelated as follows:

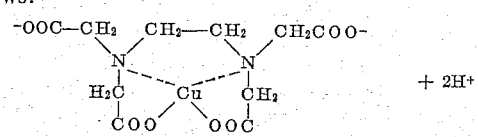

When "Cuprisene" is added to a mud filtrate containing a preferred zinc chelate, the cupric ion is preferentially complexed by the tetrahydroxyethylethylenediamine to form a soluble deep blue chelate while the displaced zinc ion, which would otherwise tend to precipitate as the hydroxide, is picked up by the Versene and retained in solution. This zinc-Versene complex is colorless and does not affect the phototester reading.

This test may be carried out by filtering a small sample of the mud and accurately measuring a portion of the filtrate, preferably 4 ml., into a suitable vessel for determining the color, preferably a phototester bottle, for a "Nalco phototester." "Cuprisene" solution is added to the filtrate in proportion of 10 ml. "Cuprisene" per 4 ml. of filtrate. The visible formation of a deep blue copper-tetrahydroxyethylethylenediamine complex is in itself an excellent qualitative test for the chelate and may be used at the well head as a quick method for determining if there is an appreciable excess of chelate in the mud. For a more accurate determination of the quantity of excess chelate, it is preferred to use a "Nalco phototester." A reading of 12 on this instrument corresponds approximately to 3 pounds per barrel excess zinc chelate present in the mud and a reading of 8, to 2 pounds per barrel excess. The correlation between readings on this phototester and the pounds per barrel excess chelate present in the mud is substantially linear.

A mud which has been converted by the addition of the chelates of the present invention has a great deal excess tolerance for low gravity clay solids over the muds in common use; but due to the nonhydrated nature of this system, the fluid-loss reducing properties normally associated with clays, such as bentonite, are not present, even when the slurry is prehydrated. The prehydrated bentonite slurry becomes excessively thick during the make up, but it thins out so much that it permits weight settling.

*Example 1*

In order to compare the effect of the chelate of the present invention with that of a widely used surfactant in lowering the apparent viscosity and yield point of a bentonite slurry, a mud system was made up containing 20 pounds of bentonite per barrel of tap water. This material was divided into aliquots, one part receiving no further treatment; the second aliquot receiving one pound per barrel of a surfactant consisting essentially of phenol adducted with 30 mols of ethylene oxide (sold under the trade name of "P-30"); and to a third aliquot one pound per barrel of ethylenediamine and one-half pound per barrel of $CuCl_2 \cdot 2H_2O$ were added. The muds were stirred for ten minutes with a Waring Blendor and aged overnight at room temperature. Bentonite in the proportion of 5 pounds per barrel was added to each of the samples and the procedure was repeated. Again, the 5 more pounds per barrel of bentonite were added to each of the samples and the procedure was repeated in that each was stirred 10 minutes on a Waring Blendor and aged overnight at room temperature. The following results were obtained:

20 POUNDS PER BARREL BENTONITE

| | A.V. |
|---|---|
| No Surfactant | 18 |
| P-30 | 12 |
| Ethylenediamine+$CuCl_2 \cdot 2H_2O$ | 4 |

25 POUNDS PER BARREL BENTONITE

| | A.V. |
|---|---|
| No Surfactant | 47 |
| P-30 | 25 |
| Ethylenediamine+$CuCl_2 \cdot 2H_2O$ | 5 |

30 POUNDS PER BARREL BENTONITE

| | A.V. | Y.P. |
|---|---|---|
| No surfactant | 105 | 96 |
| P-30 | 57 | 38 |
| Ethylenediamine+$CuCl_2 \cdot 2H_2O$ | 6 | 2 |

*Example 2*

In order to compare the relative effect of chelates made from zinc chloride and zinc sulfate ($ZnSO_4 \cdot H_2O$), a mud was made up by suspending 50 pounds of bentonite per barrel of tap water, and 4½ pounds per barrel of tetrahydroxyethylethylenediamine. Zinc chloride and zinc sulfate were added in the proportions shown in the table below. The muds were mixed for 5 minutes with a Waring Blendor and allowed to stand for 3 days at room temperature. The following results were obtained:

| | A.V. |
|---|---|
| 1 lb. $ZnCl_2$ | 45 |
| 2 lb. $ZnCl_2$ | 22 |
| 3 lb. $ZnCl_2$ | 11 |
| 4 lb. $ZnCl_2$ | 7 |
| 5 lb. $ZnCl_2$ | 6 |
| 1 lb. $ZnSO_4 \cdot H_2O$ | 80 |
| 2 lb. $ZnSO_4 \cdot H_2O$ | 47 |
| 3 lb. $ZnSO_4 \cdot H_2O$ | 22 |
| 4 lb. $ZnSO_4 \cdot H_2O$ | 14 |
| 5 lb. $ZnSO_4 \cdot H_2O$ | 12 |
| 3¼ lb. $CuCl_2 \cdot 2H_2O$ | 15 |
| 4.8 lb. $CuCl_2 \cdot 2H_2O$ | 18 |

These results plotted on a graph give curves which are substantially parallel. It is probable that the better results obtained per pound of zinc chloride added are at least partially due to the higher proportion of zinc contained in this material. It was determined that pound per pound, zinc chloride is a much more effective material for the formation of chelates than zinc sulfate.

*Example 3*

A mud was made up containing 0.86 barrel of tap water, 18 pounds per barrel of bentonite, 5 pounds per barrel of gypsum, 2 pounds per barrel of technical grade CMC and 140 pounds per barrel of barite. To aliquots of this mud, various surfactants were added. These were 5 pounds per barrel of "DMS," a commercially available drilling mud surfactant containing 56 percent of phenol adducted with 30 mols of ethylene oxide, 4 percent phenol adducted with 2 mols of ethylene oxide, and 40 percent water. Into a second aliquot were introduced 4.5 pounds per barrel of tetrahydroxyethylethylenediamine and 3 pounds per barrel of $CuCl_2 \cdot 2H_2O$. Into a third aliquot 9 pounds per barrel of 80 percent aqueous solution of a zinc chelate made by reacting tetrahydroxyethylethylenediamine with zinc chloride in equal molecular proportions was introduced. XACT clay (a calcium montmorillonite type clay having an average yield of 31 barrels per ton) was added to each in the quantities indicated in the table below. Apparent viscosity, yield point and A.P.I. fluid loss were determined on each of these aliquots with the following results:

APPARENT VISCOSITY IN CENTIPOISES

| | XACT Clay Added (lbs./bbl.) | | | |
|---|---|---|---|---|
| | 20 | 40 | 60 | 80 |
| DMS | 109 | 100 | TTM | |
| Zn Chelate Solution | 33 | 41 | 42 | 55 |
| Tetrahydroxyethylethylenediamine+$CuCl_2 \cdot 2H_2O$ | 37 | 39 | 41 | 40 |

YIELD POINT

| | XACT Clay Added (lbs./bbl.) | | | |
|---|---|---|---|---|
| | 20 | 40 | 60 | 80 |
| DMS | 72 | 32 | 58 | |
| Zn Chelate Solution | 1 | 0 | 2 | 7 |
| Tetrahydroxyethylethylenediamine+$CuCl_2 \cdot 2H_2O$ | −1 | −2 | 0 | −1 |

A.P.I. FLUID LOSS IN ML.

| | XACT Clay Added (lbs./bbl.) | | | |
|---|---|---|---|---|
| | 20 | 40 | 60 | 80 |
| DMS | 6 | 6 | 7 | |
| Zn Chelate Solution | 13 | 11 | 12 | |
| Tetrahydroxyethylethylenediamine+CuCl$_2$·2H$_2$O | 13 | 14 | 15 | |

*Example 4*

The effects of the surfactant "DMS" of Example 3 and the 80 percent solution of chelate described therein on apparent viscosity, yield point and fluid loss in bentonite and attapulgite base muds were compared. The bentonite system contained 0.86 barrel of tap water, 18 pounds of bentonite, 5 pounds of gypsum, 5 pounds per barrel of "DMS" or 9 pounds per barrel of the zinc chelate solution, 2 pounds per barrel of technical grade CMC and 140 pounds per barrel barite to give a mud having a weight of 11 pounds per gallon. The attapulgite system contained 0.86 barrel of tap water, 18 pounds per barrel of attapulgite, 9 pounds per barrel of the zinc chelate solution, 3 pounds per barrel of technical grade CMC and 140 pounds per barrel of barite to make an 11 pounds per gallon mud. To each of these muds a calcium montmorillonite, sold under the trade name of XACT clay, was added in increments of 10 pounds per barrel. The apparent viscosity, yield point and A.P.I. fluid loss were determined after each addition. The following results were obtained:

APPARENT VISCOSITY IN CENTIPOISES

| | XACT Clay Added (lbs./bbl.) | | | | |
|---|---|---|---|---|---|
| | 20 | 40 | 60 | 80 | 100 |
| DMS—Bentonite | 108 | 100 | TTM | | |
| Zn Chelate—Bentonite | 36 | 40 | 51 | 69 | 100 |
| Zn Chelate—Attapulgite | 28 | 31 | 38 | 47 | 60 |

YIELD POINT

| | XACT Clay Added (lbs./bbl.) | | | | |
|---|---|---|---|---|---|
| | 20 | 40 | 60 | 80 | 100 |
| DMS—Bentonite | 68 | | | | |
| Zn Chelate—Bentonite | 1.7 | 0 | 1 | 6 | 15 |
| Zn Chelate—Attapulgite | 8 | 10 | 10 | 14 | 20 |

A.P.I. FLUID LOSS IN ML.

| | XACT Clay Added (lbs./bbl.) | | | | | |
|---|---|---|---|---|---|---|
| | 20 | 40 | 60 | 80 | 100 | 120 |
| DMS—Bentonite | 5 | 5 | 5 | 5 | | |
| Zn Chelate—Bentonite | 40 | 37 | 36 | 36 | 36 | 36 |
| Zn Chelate—Attapulgite | 12 | 13 | 11 | 11.5 | 12.5 | 18 |

The zinc chelate was found to be far superior in maintaining desirable viscosity and yield point but required more CMC to maintain the fluid loss within desirable ranges. Attapulgite reduced fluid loss.

*Example 5*

Muds having a weight of 16 pounds per gallon were made up using 0.66 barrel of tap water, 6 pounds per barrel of bentonite, 5 pounds per barrel of gypsum, 2 pounds per barrel of CMC, 438 pounds per barrel of barite, and either 5 pounds per barrel of "DMS" or 4.5 pounds per barrel of tetrahydroxyethylethylenediamine plus 3 pounds per barrel of CuCl$_2$·2H$_2$O. XACT clay was added to each in increments of 10 pounds per barrel and the yield points were determined after each addition of clay. The following results were obtained:

YIELD POINT

| XACT Clay Added (lbs./bbl.) | | | | | | | | | |
|---|---|---|---|---|---|---|---|---|---|
| | 0 | 10 | 20 | 30 | 40 | 50 | 60 | 70 | 80 |
| | 40 | 57 | | | | | | | |
| | 7 | 4 | 3 | 4 | 7 | 11 | 15 | 16 | 12 |

It will be observed that the yield point of the mud containing the chelate resulting from reaction between the copper chloride and tetrahydroxyethylethylenediamine was substantially unaffected by contamination with hydratable clays in quantities up to 80 pounds per barrel while "DMS" failed to control the yield point of the mud.

*Example 6*

The effect of ethylenediamine-copper chloride complex in preventing normal hydration of bentonite was determined by suspending 20 pounds of bentonite in tap water containing 1 pound per barrel of ethylenediamine and ½ pound per barrel of copper chloride CuCl$_2$·2H$_2$O. The sample was allowed to age overnight at room temperature and its apparent viscosity, plastic viscosity, yield point, pH and A.P.I. fluid loss were determined.

Bentonite was added to the sample in increments of 5 pounds per barrel; and after each addition of bentonite, the sample was allowed to stand at room temperature overnight and its properties were determined. The following results were obtained:

| Lb./bbl. Bentonite Added (Total lb./bbl.) | App. Vis. | Plastic Vis. | Yield Point | pH | A.P.I. Fluid-Loss in cc. |
|---|---|---|---|---|---|
| 20 | 4 | 4 | 0 | 11.3 | 78 |
| 25 | 5 | 5 | 0 | 10.1 | 92 |
| 30 | 6 | 5 | 2 | 10.0 | 50 |
| 35 | 11 | 8 | 6 | 10.2 | 35 |
| 40 | 32 | 19 | 26 | 10.1 | 20 |

*Example 7*

The effects of various contaminants on a field mud containing a zinc chelate made by reacting zinc chloride with tetrahydroxyethylethylenediamine were studied.

The mud used in these experiments was taken from the mud pit of a field well and had the following properties initially:

| | |
|---|---|
| Apparent viscosity | 23 |
| Plastic viscosity | 8 |
| Yield point | 30 |
| Gels | 25/28 |
| pH | 7.6 |
| A.P.I. fluid loss | 35 |
| Mud weight lb./gal | 10.6 |
| Percent solids | 15 |
| Percent water | 85 |
| Percent oil | 0 |

This base mud was converted to a surfactant mud by adding 6 pounds per barrel of the zinc chelate and 3 pounds per barrel of CMC. The various contaminants were added at the concentration given in the table below and the mud was aged as indicated.

| Conditions of Aging | Contaminant | | App. Vis. | Plastic Vis. | Yield Point |
|---|---|---|---|---|---|
| | Kind | lb./bbl. | | | |
| Heated overnight, 150° F., Rotating. | Blank | 0.0 | 19 | 18 | 2 |
| | Gypsum | 5.0 | 16 | 15 | 2 |
| | Green Cement | 1.0 | 19 | 17 | 4 |
| | ----do---- | 5.0 | 21 | 18 | 6 |
| | NaCl | 10.0 | 15 | 15 | 0 |
| | Bentonite | 30.0 | 40 | 30 | 20 |
| Above samples re-heated overnight, 250° F., Rotating. | Blank | 0.0 | 10 | 10 | 0 |
| | Gypsum | 5.0 | 10 | 9 | 2 |
| | Green Cement | 1.0 | 11 | 10 | 2 |
| | ----do---- | 5.0 | 14 | 13 | 2 |
| | NaCl | 10.0 | 11 | 11 | 0 |
| | Bentonite | 30.0 | 40 | 30 | 20 |

| Conditions of Aging | Contaminant | | Gels | pH | A.P.I. Fluid-loss | lb./bbl. Excess Hy-Tol |
|---|---|---|---|---|---|---|
| | Kind | lb./bbl. | | | | |
| Heated overnight, 150° F., Rotating. | Blank | 0.0 | ⅙ | 7.5 | 4.8 | 0.9 |
| | Gypsum | 5.0 | ¼ | 7.4 | 6.6 | 0.9 |
| | Green Cement. | 1.0 | ⅛ | 8.2 | 5.0 | 0.7 |
| | ----do---- | 5.0 | ⅛ | 10.5 | 7.0 | 0.7 |
| | NaCl | 10.0 | ¼ | 7.6 | 7.0 | 0.9 |
| | Bentonite | 30.0 | 1⅝s | 7.5 | 6.0 | 0.0 |
| Above samples re-heated overnight, 250° F., Rotating. | Blank | 0.0 | ⅓ | 7.8 | 10.2 | 1.3 |
| | Gypsum | 5.0 | ⅓ | 7.6 | 16.4 | 1.3 |
| | Green Cement. | 1.0 | ⅓ | 7.8 | 9.8 | 1.3 |
| | ----do---- | 5.0 | ¼ | 20.7 | 10.5 | 0.7 |
| | NaCl | 10.0 | ⅓ | 7.8 | 14.4 | 1.3 |
| | Bentonite | 30.0 | 29⁄54 | 7.6 | 10.1 | 0.7 |

*Example 8*

The effect of various diamines in combination with zinc chloride in preventing the hydration of bentonite was tested by the following procedure. The diamines and the amounts of zinc chloride set forth in the following table were first dissolved in tap water. Bentonite was then added at a level of 50 pounds per barrel, mixed for 5 minutes on the Waring Blendor and allowed to age overnight at room temperature.

The zinc chloride and the diamines were used on an equimolecular basis. Apparent viscosity, yield point pH and A.P.I. fluid loss of the resulting muds were determined. The following results were obtained:

| Diamines (Held Constant at 4.5 lb./bbl.) | lb./bbl. ZnCl₂ | App. Vis. | Yield Point | pH | A.P.I. Fluid-Loss, percent |
|---|---|---|---|---|---|
| Tetrahydroxyethylethylenediamine | 2.6 | 15 | 24 | 6.9 | 100 |
| Dihydroxyethyldihydroxypropylethylenediamine | 2.3 | 15 | 24 | 6.9 | 100 |
| Dihydroxyethylethylenediamine | 4.1 | 9 | 10 | 6.5 | 100 |
| | 2.0 | 24 | 36 | 7.6 | 100 |
| Hexahydroxyethyltriethylenetetramine | 1.5 | 41 | 78 | 7.8 | 94 |
| Dihydroxypropylethylenediamine | 3.5 | 9 | 10 | 6.5 | 100 |
| Dihydroxypropylpropylenediamine | 3.2 | 12 | 16 | 6.6 | 100 |
| Dihydroxyethylpropylenediamine | 3.8 | 8 | 10 | 6.5 | 100 |
| Dihydroxyethyldihydroxybutylethylenediamine | 2.1 | 20 | 30 | 7.1 | 100 |
| Ethylenediamine | 10.2 | 9 | 14 | 6.6 | 100 |
| Triethylenetetramine | 4.2 | 6 | 6 | 6.9 | 100 |
| Tetraethylenepentamine | 3.3 | 8 | 8 | 7.4 | 100 |

From the foregoing, it will be seen that this invention is one well adapted to attain all of the ends and objects hereinabove set forth, together with other advantages which are obvious and which are inherent to the process and method.

It will be understood that certain features and subcombinations are of utility and may be employed without reference to other features and subcombinations. This is contemplated by and is within the scope of the claims.

The invention having been described, what is claimed is:

1. An improved process for drilling a well through a heaving shale formation which comprises the steps of circulating a well fluid comprising an aqueous suspension of a hydratable clay material through the well while drilling down to a level adjacent to the heaving shale formation; then diluting the well fluid with water; adding tetrahydroxyethylethylenediamine and a water-soluble zinc salt separately to the well fluid in substantially stoichiometric proportions required to form a zinc chelate by reaction of the zinc salt and tetrahydroxyethylethylenediamine, forming such zinc chelate in situ; controlling the proportions of tetrahydroxyethylethylenediamine and water-soluble zinc salt added to produce said zinc chelate in excess of the amount adsorbed on the clay material; adding attapulgite to the well fluid in the quantity to increase weight-supporting power; and adding a fluid-loss-reducing amount of carboxymethyl cellulose.

2. A well fluid having tolerance for hydratable clay solids comprising a hydratable clay material in aqueous suspension; a zinc chelate, made by reacting a water-soluble zinc salt with tetrahydroxyethylethylenediamine, in quantity in excess of the amount of such chelate adsorbed on the clay material; and a fluid-loss-reducing amount of carboxymethyl cellulose and attapulgite in quantity sufficient to increase weight-supporting power of the well fluid.

3. The well fluid of claim 2 in which the excess of zinc chelate is about 2 pounds per barrel of well fluid.

4. The well fluid of claim 2 in which the zinc chelate is made by reacting tetrahydroxyethylethylenediamine with zinc chloride.

References Cited in the file of this patent

UNITED STATES PATENTS

| 2,686,798 | Gmitter | Aug. 17, 1954 |
| 2,786,069 | Kundiger et al. | Mar. 19, 1957 |
| 2,816,866 | Van Olphen | Dec. 17, 1957 |
| 2,873,251 | Jones | Feb. 10, 1959 |
| 2,947,360 | Bernard | Aug. 2, 1960 |

FOREIGN PATENTS

| 803,544 | Great Britain | Oct. 29, 1958 |
| 602,457 | Canada | July 26, 1960 |

OTHER REFERENCES

Burdyn et al.: That New Drilling Fluid for Hot Holes Article in the Oil and Gas Journal, Sept. 10, 1956, pages 104–107.